Feb. 12, 1952            C. M. EASON            2,585,234
CLUTCH CONTROL MECHANISM
Filed July 12, 1948                                           5 Sheets-Sheet 1
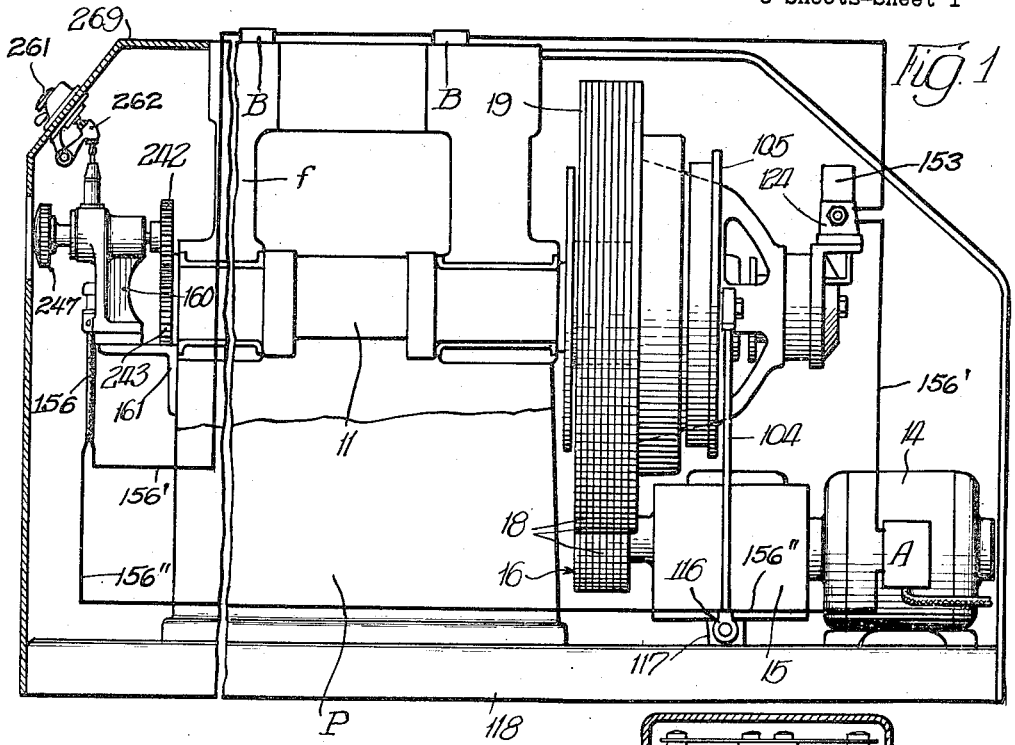
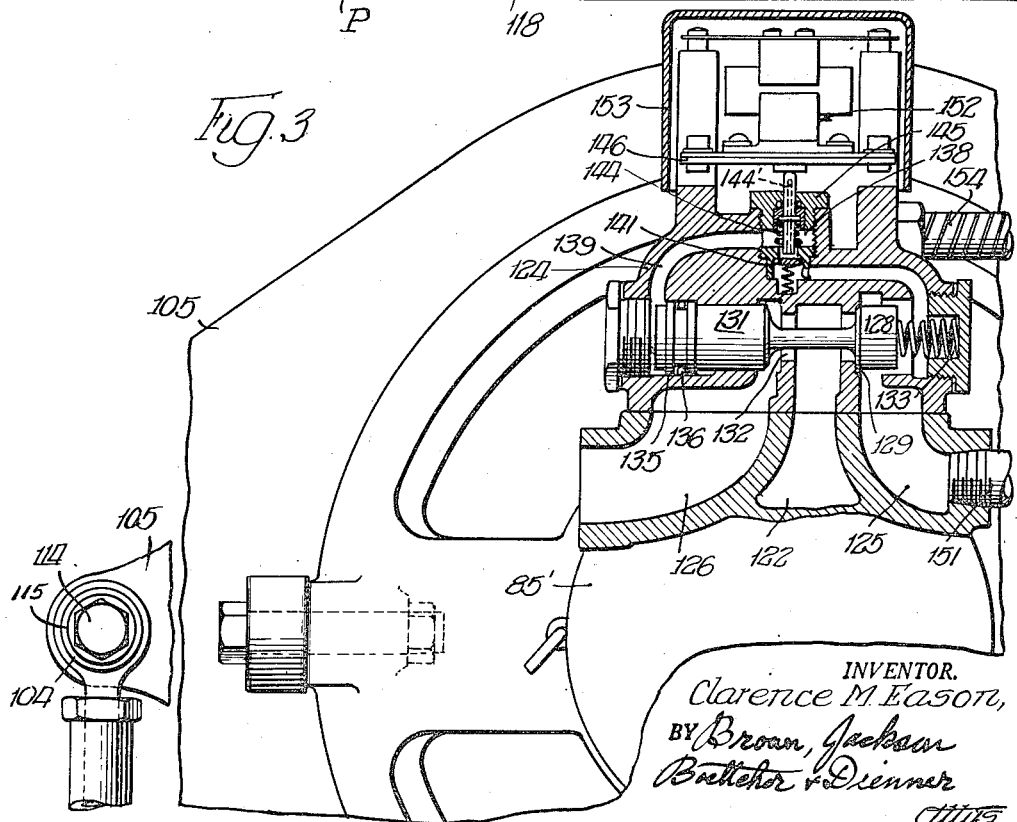
INVENTOR.
Clarence M. Eason,
BY Brown, Jackson,
Boettcher & Dienner
ATTYS.

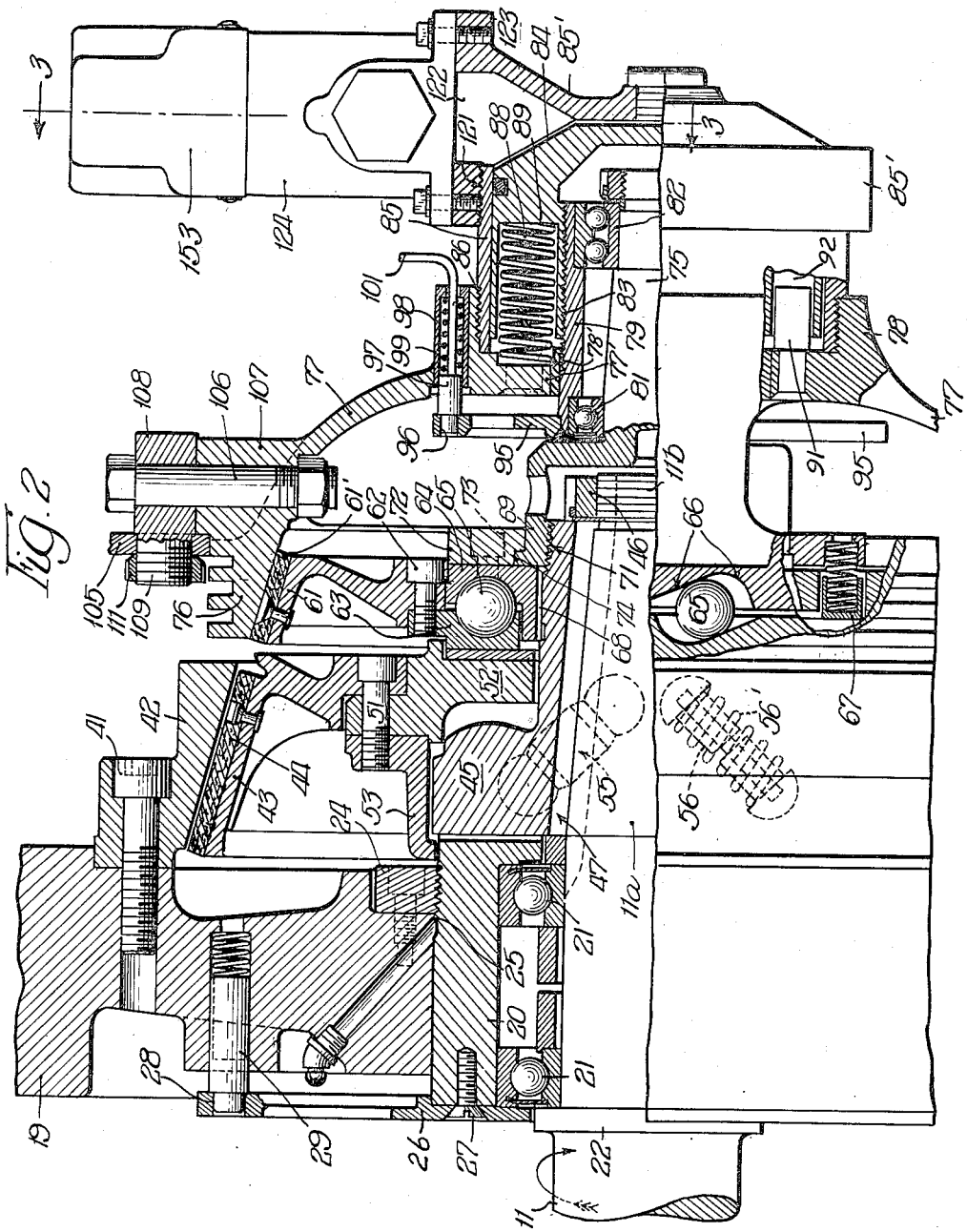

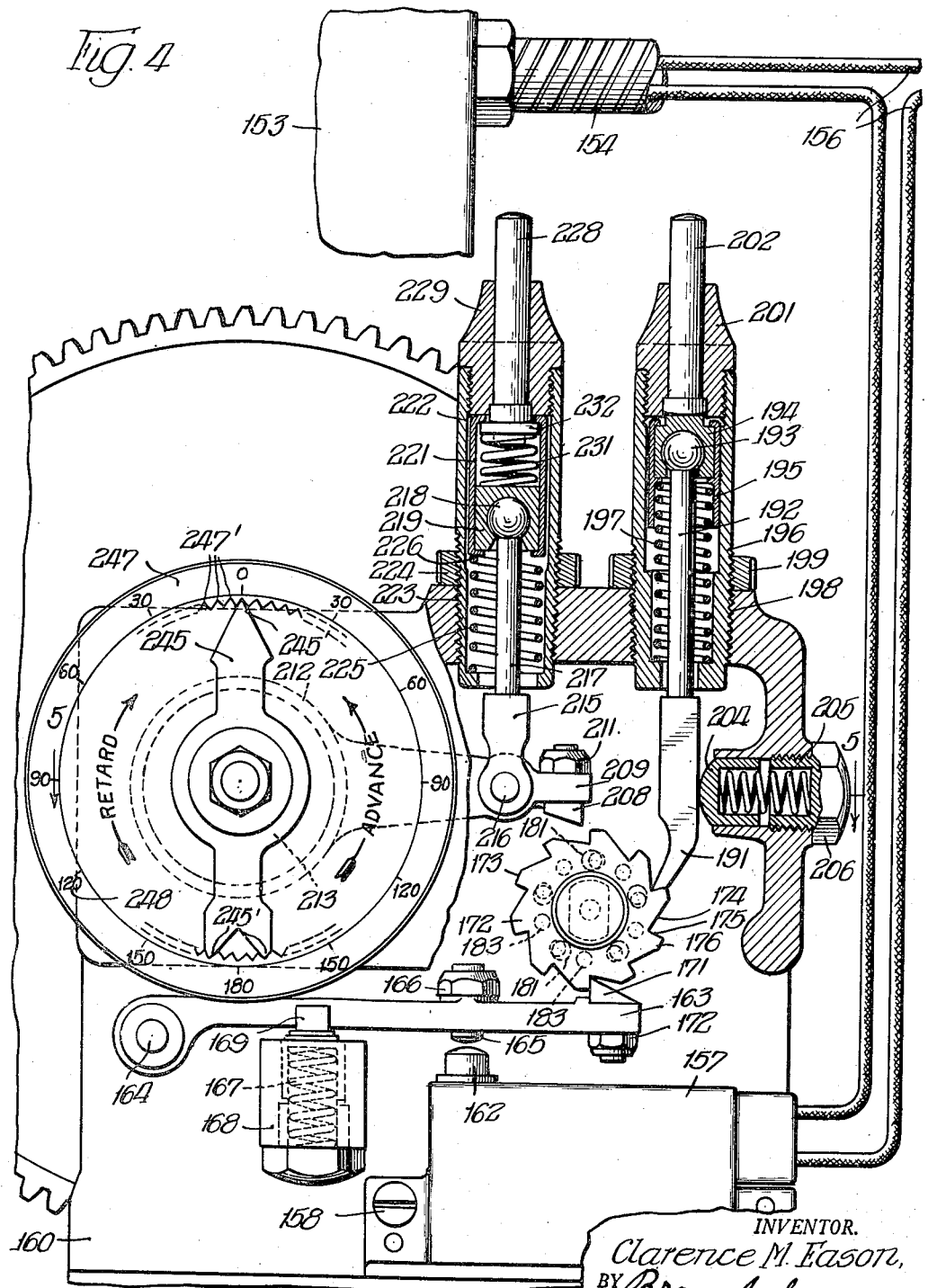

Feb. 12, 1952             C. M. EASON            2,585,234
CLUTCH CONTROL MECHANISM
Filed July 12, 1948                           5 Sheets-Sheet 4
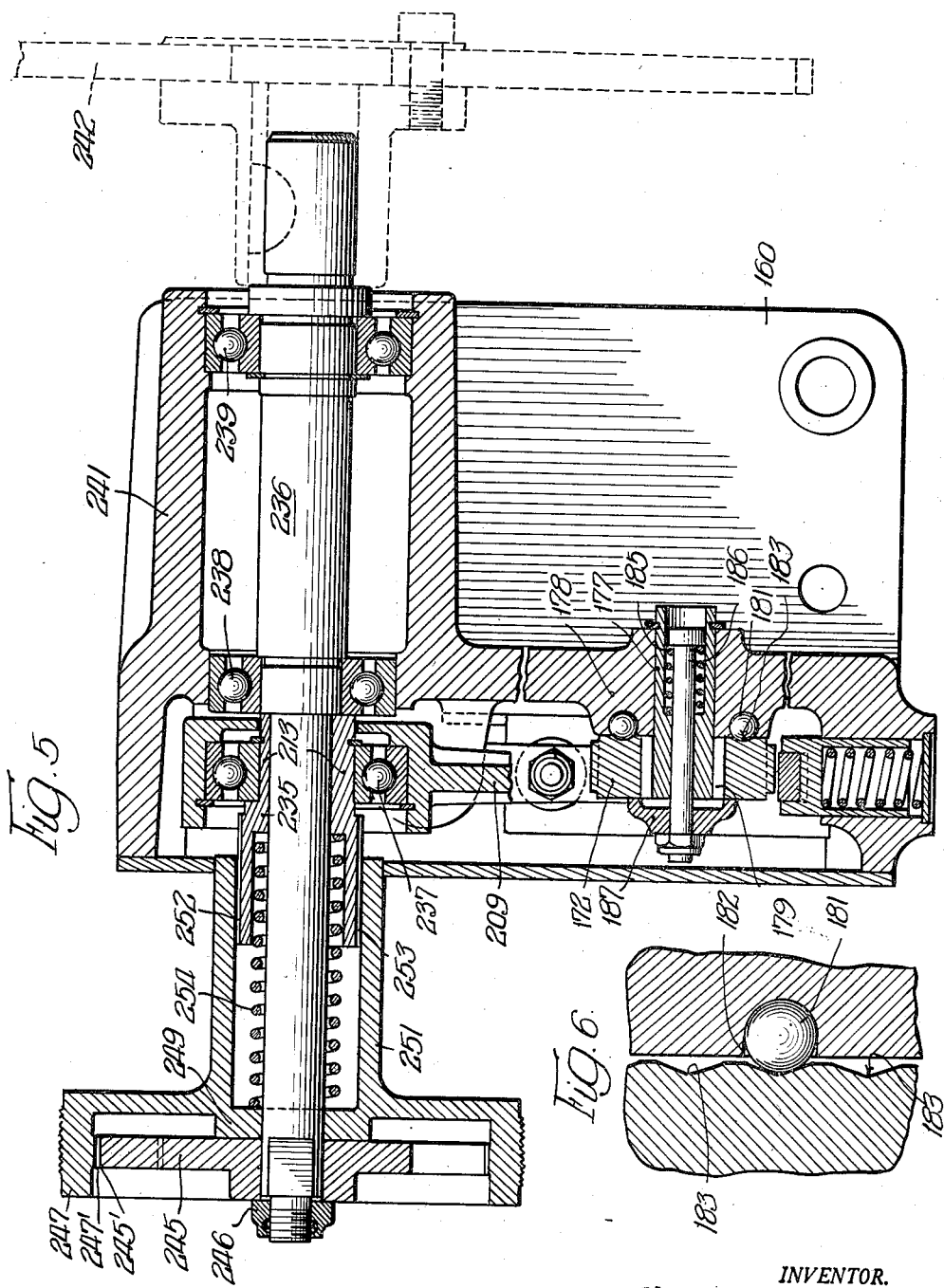
INVENTOR.
Clarence M. Eason,
BY Brown, Jackson,
Boettcher & Dienner
ATTYS.

Feb. 12, 1952     C. M. EASON     2,585,234
CLUTCH CONTROL MECHANISM
Filed July 12, 1948     5 Sheets-Sheet 5
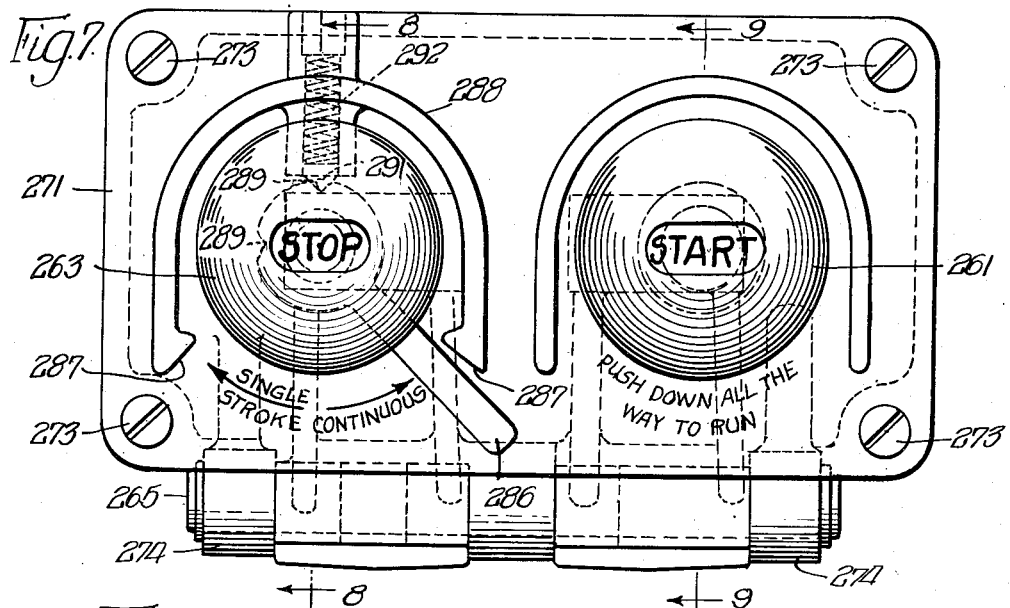
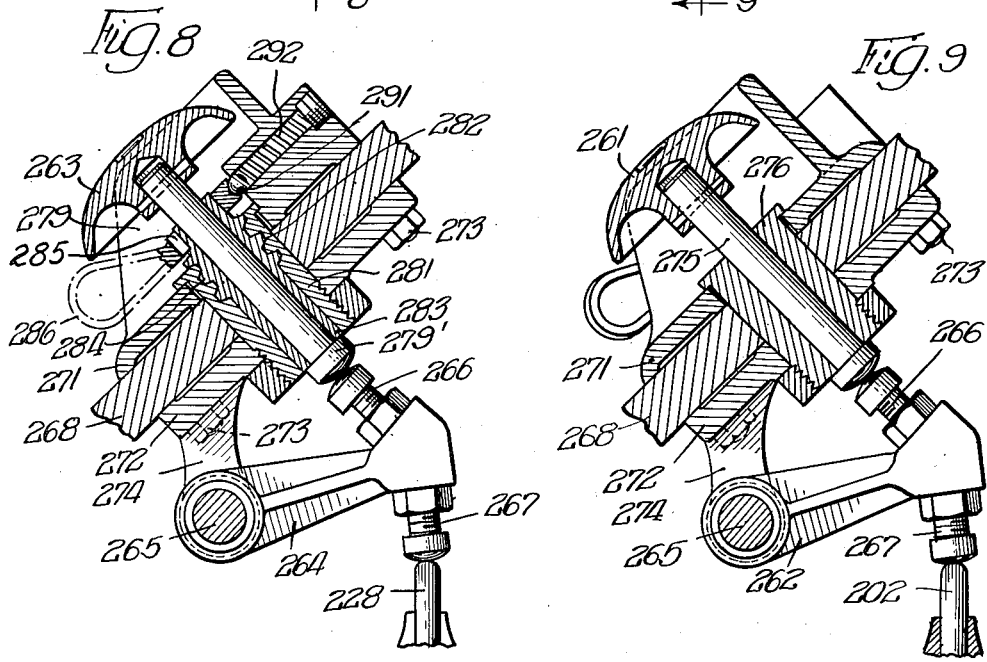
INVENTOR.
Clarence M. Eason
BY Brown, Jackson,
Boettcher & Dienner
Attys.

Patented Feb. 12, 1952

2,585,234

UNITED STATES PATENT OFFICE 2,585,234

CLUTCH CONTROL MECHANISM

Clarence M. Eason, Waukesha, Wis., assignor to Industrial Clutch Corporation, Waukesha, Wis., a corporation of Wisconsin Application July 12, 1948, Serial No. 38,248

13 Claims. (Cl. 192—144)

The present invention relates to an improved clutch control mechanism, and has particular reference to control mechanisms intended to be applied to industrial clutches, such as those used for operating punch presses and other industrial machinery. I shall hereinafter refer to a preferred or typical use of my invention in connection with friction clutches for driving punch presses, but I wish it to be understood that the invention is not necessarily limited to use with clutches of this type.

The present invention may be regarded as a further step in the development of punch press clutches of the friction type represented in my prior Patents Nos. 2,268,578, 2,308,679, 2,308,680, 2,308,681, 2,340,416, 2,348,891, and 2,408,301. These punch press clutches must enable the operator to obtain selectively, as he desires, either single stroke operation wherein the ram makes one downward movement and returns back up to its raised position, or continuous repeating operation wherein the ram makes repeated strokes until the clutch is disengaged.

As previously pointed out in my above prior patents, there has been a continuous trend in recent years toward higher and higher speeds in heavy duty punch presses. One reason for this is the obvious one of increasing the output of such presses. Another reason, not so obvious, is that the higher speeds produce a cleaner, sharper, molecular separation of the metal, in the performance of the punching operation. That is to say, when punching out blanks and performing other operations where a clean-cut shear of the metal is desired, as distinguished from a drawing operation where there is no complete separation of the metal, the higher speeds produce a sharper, clearer shear of the metal. Furthermore, it is arguable that the higher speeds, with their higher kinetic energies in the ram and in the movable die, use less power. Still another reason for higher speeds is the psychological effect upon the workmen. There is no delay in waiting for the machine to perform its operation. Instead, the reverse is true because the machine is then waiting for the man. Hence, the man is inspired to work faster in an effort to keep up with the machine.

The problem of controlling the clutch for selectively obtaining either single stroke operation or continuous repeating operation becomes a problem of increasing magnitude as these rotative speeds are carried up higher and higher. As the press speeds are increased to 400, 500 or 600 R. P. M., or even higher, a point is soon reached where the operating interval for a single stroke operation is so short that the workman cannot operate any conventional control fast enough to insure that the clutch will move into engagement, drive the ram, and then move out of engagement all within one revolution, so that there will be only a single stroke of the ram and so that the ram will come to rest substantially at the top of its stroke. At 300 R. P. M. one revolution represents only one-fifth of a second, and at 600 R. P. M. it represents only one-tenth of a second, from which it will be seen that it is physically impossible for a man to actuate a control device and then release it within this small fraction of a second. In addition to this question of whether it is physically possible for a human being to perform the necessary human operation within such an extremely short time interval, there is also the factor of the control mechanism itself being able to get the clutch engaged and disengaged within the extremely short time interval necessary to limit operation to a single stroke of the ram. Very substantial dangers can arise in the event that the control mechanism is set to cause a single stroke operation, and the mechanism fails to release the clutch in time, so that the ram performs two or more downward strokes instead of a single stroke. This can be a grave hazard to the press operator.

One of the main objects of the present invention is to provide an improved clutch control mechanism which will be capable of operating at relatively high rotative speeds without risk to the press attendant by providing control apparatus which, when set for a single stroke operation, responds to the initiating actuation of the press attendant for starting clutch engagement, and which thereupon instantly places the remainder of the control function entirely beyond anything that the attendant can do or fail to do. That is to say, the attendant pushes a particular button to start this single stroke operation, and immediately with this initiation of the control cycle all further response of the control cycle to the position of the push button is taken away and is placed under the automatic control of the machine, so that if the attendant fails to remove his finger from the button quickly enough or if he inadvertently or intentionally keeps his finger pressed against the button, this still cannot cause accidental repeating operation of the press.

Another object of the invention is to provide improved clutch control mechanism utilizing fluid pressure, such as compressed air, to effect the actual shifting the clutch, and utilizing an electrical control circuit responding to manual push buttons and to press driven timer means for controlling the application and/or release of the fluid pressure.

Another object of the invention is to provide an improved clutch-brake control for punch presses which will be capable of acting anywhere in the 360 degrees of crank rotation to stop the movement of crank and press ram instantly in case of a jam in the dies or failure of the automatic stock feeding mechanism. Presses that run at these high speeds cannot be hand fed very effectively, and when running on an automatic feed, continuous cycle it is not possible for an operator to see a jammed die and act quickly enough to stop the press within a short enough time to prevent damage to expensive die sets. However, with the electrically responsive clutch-brake control of the present invention, characterized by automatic safety switches set to operate instantly when anything goes wrong, it is possible to automatically detect any malfunctioning and to stop the crank rotation instantly, considerably before an operator could see anything was wrong, and long before he could stop the press.

Other objects, features and advantages of the invention will appear from the following detail description of two preferred embodiments thereof. In the accompanying drawings illustrating such embodiments:

Figure 1 is a fragmentary side view of a punch press illustrating my improved control mechanism associated therewith;

Figure 2 is a fragmentary view, partly in section, showing a preferred construction of clutch with which I employ my improved clutch control mechanism;

Figure 3 is a fragmentary sectional view corresponding to a section taken on the plane of the line 3—3 of Figure 2, for illustrating the electrically responsive compressed air valve.

Figure 4 is a front view, partly in elevation and partly in section, showing the control switch, switch actuator, start and stop pawls, and automatic timer of my improved clutch control mechanism;

Figure 5 is a horizontal sectional view taken approximately on the plane of the line 5—5 of Figure 4;

Figure 6 is a detail sectional view on a larger scale of a ball type of full-stroke mechanism that I preferably use with the switch actuator;

Figure 7 is a front elevational view looking at the face of the control panel in which are mounted the Stop and Start push buttons; and Figures 8 and 9 are axial sectional views of these push buttons, taken on the section planes 8—8 and 9—9 of Figure 7.

In Figure 1 of the drawings I have shown fragmentarily a portion of a frame $f$ of a punch press P of conventional type, this frame having mounted therein in any suitable manner a rotatable crank shaft 11. It will be understood that the press is provided with a ram connected by a connecting rod to the crank shaft 11, such parts being conventional and well known and therefore not illustrated in detail in the drawings. The press is adapted to be driven by an electric motor 14, shown as transmitting its drive to the press through a variable speed drive unit 15 (such as a Reeves unit), although it will be understood that the provision of such a unit is optional. The output shaft of this variable speed unit 15 carries a multiple groove pulley 16 which is operatively connected through a multiple belt drive 18 with a large multiple groove fly wheel 19 mounted coaxially of the crank shaft 11.

Referring now to Figure 2, it will be seen that the driving fly wheel 19 is mounted on a mounting collar 20 which is rotatably supported on crank shaft 11 adjacent the side of frame $f$ by means of ball bearings 21 of any preferred type. The innermost of these two ball bearings bears against a thrust collar or flange 22 on the crank shaft. Provision is preferably made for axially shifting the driving fly wheel 19 to different adjusted positions along the mounting collar 20, this being accomplished by providing the hub of the fly wheel with an internally threaded ring 24 which screws over an external adjusting thread 25 on the mounting collar 20. Thus, rotative adjusting movement between the fly wheel 19 and the mounting collar 20 will enable the fly wheel to be shifted axially along the mounting collar. The fly wheel is adapted to be angularly locked in its different adjusted positions along the collar by the provision of a locking plate or ring 26 which is screwed at 27 to the end of the collar, and which carries a circularly spaced ring of locking holes 28 in its outer portion. One or more spring pressed locking plungers 29 are mounted in bores in the web of the fly wheel 19, and are adapted to snap into the locking holes 28 after an axial adjustment of the fly wheel has been made.

Secured to the outer face of the driving fly wheel 19 by bolts or screws 41 is a driving clutch cone 42, this preferably being a female cone which converges to a smaller diameter towards its outer end. Mounted within this female driving cone is a male driven cone 43 which is adapted for shifting movement into and out of engagement with the driving cone. The above described axial shifting adjustment of the fly wheel 19 relatively to the mounting collar 20 enables axial adjustments to be made between the two clutch cones 42 and 43, such as for the purpose of compensating for the wear of the clutch facing 44 which is shown as being secured to the outer face of the male cone 43.

The driven clutch cone 43 is preferably arranged to transmit its driving torque to the crank shaft 11 through the instrumentality of torque responsive self-energizing mechanism which increases the pressure of engagement between the two clutch cones under increasing torque load, and particularly at the moment of impact of the die with the work. This torque responsive self-energizing mechanism is shown and described in detail in my prior Patent No. 2,408,301, issued September 24, 1946, and attention is directed to that patent for the details of this mechanism. Suffice it to say here that the self-energizing mechanism comprises a tubular hub 45 having a tapered bore which is secured fast to the tapered end 11a of the crank shaft 11. A nut 46 screwing onto the threaded extremity 11b of the crank shaft serves to seat the tapered hub 45 firmly on the tapered shaft portion 11a, and a driving key 47 engages in keyways in the shaft and in the hub for transmitting torque therebetween. The driven clutch cone 43 is secured by bolts or screws 51 to a flanged ring or hub 52 and a flanged collar 53. The torque responsive self-energizing parts are arranged to function between the two hub members 45 and 52, these self-energizing parts comprising rigid torque transmitting struts 55 and compressible spring struts 56 indicated in dotted lines in Figure 2. These struts are of dumbbell formation having their spherical ends seated in spherical pockets in the two hub members 45 and 52. The rigid driving struts 55 are inclined transversely of the axis of the shaft 11 in such direction that they act under compression to transmit the drive from the hub 52 to the hub 45 in the transmission of torque to the crank shaft 11. The other spring struts 56 are inclined oppositely to the driving struts 55 and function both as energy storing members and as reverse drive members. In practice, I usually provide three driving struts 55 and three spring struts 56, although a larger number of struts may be used, if desired. These struts are preferably constructed and connected to the parts associated therewith in the manner shown and described in my prior Patents Nos. 2,308,679 and 2,308,680. As pointed out in detail in those patents, the rigid driving struts 55 react to the transmission of torque from hub member 52 to hub member 45 in such a manner as to tend to separate these hub members, whereby the driven cone 43 is forced into increased pressure engagement with the driving cone 42 under a self-energizing action when the torque load to the moving ram of the press becomes greatest.

Referring now to the axially shiftable brake mechanism which serves to control the engaging and the releasing of the clutch, this brake mechanism comprises an axially shiftable rotating brake cone 61 which is secured by screws 62 to a cam ring 63 adapted to exert axial abutting pressure against the outer face of the clutch hub 52 through any suitable friction washer. Cooperating with the cam ring 63 is a companion cam ring 64 between which are disposed balls 65 mounted in inclined grooves or runways 66 in the opposing faces of the two cam rings 63 and 64. The purpose of these cam rings and balls is to establish a servo action reacting between the two cam rings 63 and 64, whereby braking retardation exerted on the brake cone 61 operates with a servo action to apply increased inward thrusting force on the clutch hub 52 for shifting the driven clutch element 43 into clutch releasing position. It may be desirable to provide one or more spring plungers 67 to exert spreading force between the face of the cam ring 63 and an outer retainer ring 72. This ball type of servo mechanism coacting between the brake mechanism and the clutch mechanism is fully disclosed in my above-mentioned prior patents, particularly Patent No. 2,408,301. The cam ring 64 is keyed to the clutch hub 45 by keys or splines 68, and is held against shifting displacement by a mounting cap 69 which screws over a thread 71 on the end of the tubular hub 45. The mounting cap 69 is adjustably secured to the cam ring 64 by a retainer ring 72 which is secured to the cam ring 64 by screws 73 and which has an overlapping shoulder arrangement 74 with the cap 69 to lock the latter against unscrewing. Mounting cap 69 is formed with an outwardly extending stub shaft 75, axially aligned with the crank shaft 11, and on which stub shaft is mounted the cooperating outer brake member, and the fluid pressure cylinder which actuates this brake member.

This cooperating outer brake member is designated 76 and is in the form of a non-rotating, axially shiftable female brake cone adapted to engage over the inner brake cone 61. This non-rotating outer brake cone 76 is formed with spider arms 77 extending to a central hub or boss 78 which is provided with an axial bearing bushing 78' mounted for sliding movement on a nonshiftable bearing hub 79. Anti-friction bearings 81 and 82 support this hub 79 upon the stub shaft 75, so that the stub shaft can rotate while the hub 79 remains stationary. The hub 79 has an external thread 83 over which screws an internally threaded piston 84. Mounted for sliding movement over the exterior of this piston is a cylinder shell 85 which screws into the outer portion of the spider 77 at 86. It will be seen from the foregoing that the piston 84 normally remains in an axially fixed position, and that the cylinder 85 can slide back and forth over this piston, and in so doing it carries the spider 77 and shiftable brake member 76 with it.

Compression springs 88 are set into recessed pockets 89 formed within the piston 84, and the rear ends of these springs bear against the end wall 77' of spider 77, whereby the springs normally tend to slide the cylinder 85 and shiftable brake member 76 in an inward direction, so as to engage with the rotatable brake member 61. The piston 84 is held against rotation relatively to spider 77 and cylinder 85 by short studs 91 which are riveted into the housing wall 77' at spaced intervals between springs 88 and which have a sliding fit in openings 92 formed within the piston 84.

In order to adjust the brake mechanism for wear of the brake lining 61' on brake cone 61, provision is made for adjustably shifting the entire assembly of piston 84, cylinder 85, spider 77 and brake element 76 inwardly or outwardly along the length of the screw thread 83 on the exterior of the mounting hub 79. To this end, a locking flange or ring 95 is welded to the inner end of the mounting hub 79, and is provided with a circularly arranged series of latching holes 96 around its peripheral portion. A spring plunger lock 97 is reciprocally mounted in a guide bushing 98 carried by the brake housing 77, this locking plunger being normally projected inwardly into engagement with one of the locking holes 96 by the action of a compression spring 99 confined within the guide tube 98. The actuating rod of this locking plunger has an upwardly bent outer end 101 which is adapted to be pulled outwardly when it is desired to release the locking plunger 97 from one of the locking holes 96. Having thus released the locking plunger, it is a simple matter to reach between the arms of the spider 77 and rotate the locking flange 95 and mounting hub 79 while the spider 77 and other connected parts are held against rotation. This shifts the spider and the associated parts inwardly along the thread 83 for taking up wear occurring at the brake facing 61'.

The outer brake member 76 is held against rotation while still being free to shift axially through the instrumentality of two diametrically opposite torque sustaining links 104 which extend downwardly at each side of the brake member (Figure 1). These torque sustaining links have pivotal attachment with the brake member through the instrumentality of a torque yoke 105 which has a central opening adapted to fit over the brake cone 76 and which has two horizontal arms extending outwardly from each side thereof for pivotal connection with the links 104. As shown in Figure 2, bolts 106 pass outwardly through bosses 107 projecting from the spider arms 77, and these bolts pass through pivot eyes 108. Projecting from these pivot eyes are threaded studs 109 which extend through apertures in the torque yoke 105 and receive nuts 111 on the back side thereof. The outer ends of the yoke arms receive transverse bolts 114 which mount spherically shaped bushings 115. The upper ends of the torque links 104 have a ball and socket mounting on these spherical bushings 115 so as to accommodate fore and aft shifting movement of the torque yoke 105 as the non-rotating brake member 76 is shifted into and out of its braking positions relatively to the rotatable brake member 61. As shown in Figure 1, the lower ends of the torque sustaining links 104 have pivotal connection at 116 with pivot lugs 117 extending up from the mounting base 118. In conclusion with respect to the construction of the brake mechanism, I wish to point out that the compression springs 88 are designed in proportion to exert a much higher pressure than the springs 56' of the diagonal spring struts 56, possibly five or six times as much pressure, so that at all times the spring loaded brake element 76 is completely dominant over the spring loaded clutch element 43.

Referring now to the manner in which fluid pressure, preferably compressed air, is introduced between the piston 84 and cylinder 85, it will be seen from Figure 2 that the outer end of the cylinder shell 85 is externally threaded at 121 for screwing into the flanged inner end of a cylinder head 85'. The upper portion of this cylinder head is formed with a relatively large port opening 122 surrounded by an attaching flange 123 to which is bolted a control valve housing 124. Referring to Figure 3, it will be seen that the cylinder head 85' is also formed with an air inlet passageway 125 and an air outlet passageway 126 disposed on opposite sides of the passageway 122 leading to the interior of the cylinder. These three passageways 122, 125, 126 communicate with similar passageways formed within the valve housing 124. The air flow is controlled by a double ended piston valve comprising a right hand valve portion 128 controlling an inlet port 129, and a left hand valve portion 131 controlling an outlet port 132. A compression spring 133 normally tends to hold the inlet valve 128 seated against the inlet port 129. The exhaust valve piston 131 is formed with an enlarged piston portion 135 provided with a suitable piston packing ring 136. Compressed air is adapted to be admitted to the back side of this piston portion 135 through the instrumentality of a pilot valve 138 interposed in a by-pass passageway 139. The by-pass 139 leads from the chamber back of inlet valve 128 to the chamber area in back of the enlarged piston portion 135. The pilot valve 138 may be of any suitable construction, but preferably comprises a valve disk 141 which is spring pressed in an upward direction against a valve port, the pressure of the compressed air also tending to hold this valve disk against the port. This disk is adapted to be unseated by a plunger 144 extending up through a gland packing 145 and normally spring pressed to a raised position. The plunger 144 has an air venting passageway 144' extending axially therethrough, which passageway is closed at the lower end when this lower end of the plunger 144 is pressed downwardly against the valve disk 141. Downward motion of an electro-magnetically responsive armature 146 is operative to force the plunger 144 down into impact engagement with the valve disk 141 for forcing the latter from its seat, at which time the axial air venting passageway in the plunger 144 is closed by the valve disk 141. Such opening of the pilot valve admits compressed air through the by-pass 139 to the chamber area in back of the enlarged piston portion 135, whereby a pressure differential acting upon the piston valve shifts the latter to the right for closing the outlet port 132 and opening the inlet port 129, thereby admitting compressed air to the cylinder through the passageway 122. This admission of compressed air into the cylinder 85, 85' through the passageway 122 causes the cylinder to be shifted axially in an outward direction (toward the right in Figure 2) along the outer surface of the non-shiftable piston 84. Such shifting movement of the cylinder 85, 85' carries the brake cone 76 with it into a brake releasing position, out of engagement with the rotatable brake cone 61, and also compresses the brake applying springs 88. The entire valve assembly 124 shifts with the movement of the cylinder in this relatively slight brake releasing movement, and the conduit connection 151 opening into the air inlet passageway 125 either comprises a section of flexible conduit, or has any suitable swivelling connection, to accommodate this shifting movement. The armature 146 is arranged to be actuated by any suitable electro-magnetic solenoid 152 contained within the upper housing 153. The conductors for energizing the electro-magnet 152 enter the assembly through the flexible electrical conduit 154.

When the solenoid 152 is de-energized by breaking the electric circuit through the instrumentality of the clutch control mechanism to be later described, the combined air and spring pressure on the pilot valve 138 causes it to move upwardly, thereby first closing the valve disk 141, and then opening the axial air venting passageway 144' in the plunger 144 to release the entrapped air pressure through passage 139 from the large end of the exhaust valve 131. A very slight reduction of pressure on this end of the valve system causes the latter to be forced toward the left, thereby opening the exhaust valve and closing the intake valve simultaneously. This releases the air pressure in the brake cylinder and allows the brake springs 88 to apply the brake drum 76 to the revolving brake element 61, which releases the clutch and stops the rotation of the crank shaft.

From the above, it will be understood that the closing of the electric circuit energizes the air valve solenoid 152, opens the compressed air line pressure to the brake cylinder, releases the brake and allows the clutch to engage and thereby drive the crank shaft and the ram of the clutch. Conversely, when this electric circuit is broken, the solenoid 152 is deenergized, the air line pressure is shut off, and the brake cylinder is exhausted to atmosphere, thereby applying the brake, disengaging the clutch and stopping the rotation of the crank shaft. The air valve described above is a commercially available unit known to the trade as a Ross Operating Valve, Type 700—solenoid controlled and pilot operated. It has been selected for this high speed press clutch-brake service, because it is the fastest operating valve now known to be available, but it is understood that other types of three-way air valves can be used, provided the operating cycle thereof is equally rapid or preferably even faster.

It is a characteristic of alternating current solenoids that the speed of action bears a direct relation to the size of the core, length of stroke, and load; being faster for small, short stroke solenoids and relatively much slower for large, long stroke units. The use of a pilot operated air valve, as described above, permits the use of a very small, short stroke, low pressure solenoid, and results in a faster overall speed of action than would be possible if a larger solenoid acting directly upon the air valve poppets were used. Actual tests on my improved apparatus prove that complete energization and air valve shift from closed to open position takes place in approximately .033 second, and that de-energization of the solenoid and shifting from open to closed (or exhaust) position requires approximately .017 second. This type of valve is, therefore, capable of operating at the rate of twenty cycles (complete reversals) per second, or 1200 per minute, which is acceptable for high speed press operations.

Since it is more important to have fast action for applying the brakes, I prefer to use a type of air valve that is normally closed to the air line and with the solenoid circuit normally open; i. e., no current flows when the press is not operating. Due to the small size of the solenoid, the current flow when the circuit is closed amounts to only about .02 watt at 110 volts, which amount of energy can be dissipated by radiation without overheating or burning out the solenoid coils. All of these features are of decided importance to the successful functioning of my improved clutch control mechanism.

It is important that the brake release quickly, so that the clutch can fully engage before the punch contacts the work, or approximately within the first 150° of travel after top dead center. It is of even more importance that the brake application be accomplished rapidly in order to bring the crank shaft to rest at the top of the stroke. Since the clutch must be fully engaged and capable of delivering all of the kinetic energy of the fly wheel to the punch while the latter is acting upon the material to be blanked or formed (approximately 30° before lower dead center) it is, therefore, obvious that the brake application, clutch release and stopping of rotation of the crank shaft must all be accomplished in approximately 180° of crank travel. At 720 revolutions per minute, the fly wheel is making 12 revolutions per second or one revolution in .083 second. The last 180° of crank rotation available for brake application and clutch release, therefore, takes place in .041 second. The de-energization of the solenoid takes place in approximately .017 second, leaving only approximately .023 second to evacuate the brake cylinder, apply the brake and bring the crank to rest at the top of the stroke.

Such speeds, therefore, make it very important that the air control valve be located directly upon the air cylinder head, since any restrictions such as would be involved in hooking the valve up to the cylinder by means of pipe or hose connections would so retard the evacuation of the cylinder as would very likely render it impossible to act within the time available at these high speeds. This consideration also makes it important to have the lowest possible cylinder displacement; i. e., the shortest possible stroke and the largest possible exhaust passage, so as to reduce to a minimum the time required to discharge the air from the brake cylinder. As a matter of fact, the clutch brake here described makes use of an air cylinder of approximately 33 square inches area and having a stroke of only $\frac{3}{16}$ inch, or a displacement of six cubic inches. The total brake spring force necessary to release the clutch and stop the crank shaft is approximately 2,000 pounds in the size of punch press herein shown, there being approximately eight springs 88 of approximately 250 pounds pressure per spring acting upon the brake drum.

My invention has particular application to punch presses of the type herein described which must operate over a considerable range of speed, varying from around 120 strokes per minute up to approximately 720 strokes per minute. This is due the varying nature of the work to be done, and various materials to be formed or punched. Forming operations must be done at relatively slow speeds in order to give the metal time to flow or bend. In straight blanking work, however, particularly on high silicon seals used for electric motor rotors and stators or for the laminated cores of transformers, it has been found that the higher the speed the easier it is to punch this material, which also comes through the dies with a cleaner, sharper edge if punched at high speed than if forced through the dies at relatively slow speed. In the typical installation illustrated in Figure 1, I show the press as being driven through a variable speed drive unit 15 (such as a Reeves unit), which enables this wide range of speeds to be readily obtained. To accommodate the clutch control mechanism to this wide range of speeds, it is desirable to provide variable timing means for actuating the control switch which controls the flow of electric current to the air valve solenoid 152. I accomplish this by providing a power driven actuator which may be set to break the air valve solenoid circuit at any predetermined point of travel of the punch press crank shaft. It has been found that at 120 R. P. M., this break point is only approximately 10° or so before upper dead center, but that at 720 R. P. M. the break point must be moved to only approximately 10° after lower dead center.

Referring now to Figures 4 to 9, inclusive, illustrating one preferred embodiment in my improved clutch control mechanism for controlling the energization of the air valve solenoid 152, it will be seen from Figure 4 that the electrical supply circuit 156 for this solenoid has one side extending in series through a control switch 157. This control switch is preferably of the type commonly known in the trade as a "Micro-Switch," although it will be understood that other appropriate switches might be employed. This switch is secured at 158 to the front of a housing or bracket 160 which carries most of the clutch control mechanism. This bracket 160 is supported at the front end of the punch press on an angle bracket 161, as clearly shown in Figure 1. Projecting from the top of the housing of switch 157 is a switch actuating plunger 162, which has a relatively short range of movement in switches of the "Micro" type. Extending horizontally above this operating plunger 162 is a motion transmitting rocker arm 163 which has one end pivotally supported upon the mounting bracket 162 at pivot pin 164. The arm 163 transmits motion to the switch actuating plunger 162 through an adjustable tappet screw 165 which threads down through a tapped bore in the lever 163 and is held in different positions of adjustment by a lock nut 166. The motion transmitting arm 163 is normally held in its raised position by the action of a compression spring 167 contained within a spring boss 168 projecting from the mounting bracket 160. The pressure of the spring is transmitted through a plunger 169 having a yoke-shaped upper end which embraces the under side of the arm 163 for transmitting upward pressure thereto. The swinging end of the arm 163 carries a sharp edge nose 171 which is detachably secured to the arm by a clamping bolt 172 to permit ready substitution in the event of wear. This nose 171 is arranged to respond to an intermittently operating switch actuator 172 which responds to a manually operated "Start" control and to a timer driven "Stop" control. This switch actuator 172 is preferably in the form of a rotatable ratchet wheel having ratchet cam teeth 173 characterized by sloping, leading edges 174 and abrupt trailing edges 175, but I wish it to be understood that the switch actuator need not be of this specific form. As this switch actuator is advanced with a forward stepping motion, the nose 171 of the switch actuating arm 163 rides up the sloping leading edge 174 of the ratchet tooth 173 and comes to rest on the flat upper dwell 176 of this tooth. Such motion of the nose 171 depresses the switch plunger 162 and closes the switch 157. The next succeeding motion imparted to the switch actuating wheel 172 by the timer driven stop control causes the flat upper dwell of the ratchet tooth to be advanced beyond the nose 171, so that this nose can have a sharp upward movement off the abrupt trailing edge 175 for instantly opening the switch 157.

Referring to Figures 5 and 6, it will be seen that the switch actuating ratchet wheel 172 has rotatable bearing support upon a bearing bushing 177 which extends through a vertical web portion 178 of the mounting bracket 160. An anti-friction bearing 179 of the needle or roller type is preferably interposed between the ratchet wheel 172 and bushing 177. The ratchet wheel is mounted to be capable of a limited axial shifting movement either on the bushing 177 or on the bearing 179, so as to coact with a ball type of full-stroke detent mechanism acting between the ratchet wheel and the mounting boss 178. This full-stroke detent mechanism comprises a circularly arranged series of balls 181 set in pockets 182 formed in the bearing portion 178 directly in back of the ratchet wheel. As best shown in Figure 6, the adjacent end face of the ratchet wheel is formed with a series of shallow cam pockets 183 having sloping sides, typically represented by circular counterbores of shallow depth. The ratchet wheel is urged against the balls by a compression spring 185 within the bearing sleeve 177, which spring transmits pressure through rod 186 to a pressure head 187 which bears rotatably against the front face of the ratchet wheel. The ratchet wheel is shown as having ten ratchet teeth, and the back side of the wheel is provided with a corresponding number of these cam pockets 183. A corresponding or lesser number of balls 181 may be employed, the illustrated construction showing five of these balls equally spaced. The parts are so constructed and proportioned that when the ratchet wheel occupies the switch open angular position shown in Figure 4 the balls 181 will be out of the bottoms of the cam pockets 183 and will be riding against the trailing slopes of these cam pockets, tending constantly to rotate the ratchet wheel in a counter-clockwise direction in order to hold the abrupt drop-off shoulder 175 up against the switch actuating nose or pawl 171. Thus, at this time the balls are holding the ratchet wheel against any accidental rotative movement in an advancing direction, which might tend to close the control switch 157. Referring now to the action of these balls 181 when the control switch 157 is closed, at this time the pawl nose 171 is resting on the flat dwell of one of the ratchet teeth 173. With the parts in this position, one of the cam pockets 183 is lined up directly with each ball 181, so that each ball is reposing in the bottom of one of the cam pockets. At this time, the balls are functioning as a full-stroke mechanism and also as a detent mechanism. They are functioning as a full-stroke mechanism because they have tended to cause the ratchet wheel 172 to move through a full advancing stroke to the point where the flat dwell of the corresponding ratchet tooth 173 has moved into engagement with the switch actuating pawl nose 171. The balls are also functioning as a detent mechanism because they tend resiliently to hold the ratchet wheel in this actuated position until the next short switch opening motion is imparted to the ratchet wheel by the timer actuated pawl.

Referring first to the manually actuated "Start" pawl 191, this pawl is disposed to engage the teeth of the ratchet wheel on the right hand side of the wheel, and to impart a step-by-step advancing movement to the ratchet wheel in the down strokes of the pawl 191. It will be understood that a single down stroke of this pawl is operative to step the ratchet wheel 172 in a clockwise direction from the position shown in Figure 4 to a position where the flat dwell of the next succeeding ratchet tooth has ridden in under the pawl nose 171 for forcing the arm 163 down to switch closing position. This constitutes the limit of the operating movement of the "Start" pawl 191, viz. with one of the ratchet teeth in position to push the arm 163 down to switch closing position. The pawl 191 is formed at its upper end with a reduced stem 192 terminating in a ball 193. This ball has swiveling mounting in a socket block 194 confined within a guide sleeve 195. This guide sleeve is slidably mounted in a spring retaining bushing 196 in which is confined a compression spring 197 tending to thrust the guide sleeve 195 and socket 194 in an upward direction. The spring retaining bushing 196 has a screw threaded mounting 198 in the upper part of the bracket mounting 160, and is locked in any vertically adjusted position by a locking nut 199. This provides for adjusting the vertical stroke of the "Start" pawl 191. A guide bushing 201 screws into the top of the bushing 196, and guides an operating plunger 202 which has its headed lower end bearing against the top of the socket block 194. The pawl 191 is spring urged toward the left into constant contact with the ratchet wheel 172 by a spring plunger 204 which bears against the right hand side of the pawl 191 and is urged toward the left by a compression spring 205 confined within a spring cage or bushing 206.

Referring now to the "Stop" pawl 208 which is adapted to deliver the relatively short stroke advancing movement to the ratchet wheel 172, of just sufficient length to cause the flat upper dwell of the ratchet tooth to ride out from under the nose 171 and permit the nose to swing upwardly to switch opening position, this pawl 208 is adapted to have a power driven oscillatory movement in a horizontal direction, synchronously with the rotation of the crank shaft 11, but the operativeness of this pawl to engage the ratchet wheel is made dependent upon a manual control which determines whether the pawl has been shifted down to a low enough position to engage the teeth, or whether it has been raised to an upper position where it will clear the teeth. This power driven pawl 208 is mounted in the outer end of an eccentric follower arm 209, the pawl itself being a renewable unit which is held in place in the arm by the bolt and nut attachment 211. The follower arm 209 projects laterally from an eccentric follower strap or ring 212 which is mounted upon the aforementioned eccentric 213 which rotates synchronously with the crank shaft. The driving of this eccentric 213 will be later described.

The eccentric follower arm 209 is adapted to be raised and lowered between operative and inoperative positions through a clevis 215 pivotally connected to the arm 216. Projecting upwardly from this clevis is a stem 217 terminating in a ball 218 which has swivelling mounting in a socket block 219. This block has slidable mounting within a guide sleeve 221 which, in turn, is slidably mounted within an outer spring retaining bushing or sleeve 222. This outer sleeve 222 has threaded mounting 223 within the bearing bracket 160 and can be locked in any adjusted position by the lock nut 224. A compression spring 225 is confined between the lower end of the outer sleeve 222 and an inturned lip 226 at the lower end of the inner sleeve 221. This lower spring 226 tends constantly to hold the cam follower 209 in its raised position, in which position the to and fro strokes of the stop pawl 208 will be mere idling strokes because they will not be effective to engage the teeth of the ratchet wheel. When it is desired to have these power driven oscillations of the pawl 208 effective to actuate the ratchet wheel, downward pressure is exerted on the operating plunger 228 which extends up through the guide bushing 229 threaded into the upper end of the outer sleeve 222. Because there is always the possibility that this downward movement of the plunger 228 may occur at a late point in the outward travel of the pawl 209 where the pawl might land upon the flat outer dwell of one of the ratchet teeth, rather than in tooth advancing engagement against the shoulder 175 of the tooth, it follows that a resilient lost motion connection is desirable between the plunger 228 and the pawl 208. This is provided by the slidable mounting of the socket block 219 in the inner sleeve 221, and by the interposition of a compression spring 231 between the guide block 219 and the head 232 on the lower end of the plunger 228. This resilient lost motion connection enables the plunger 228 to complete its downward stroke, even though the power driven pawl 208 is momentarily striking against the top of one of the ratchet teeth. As soon as the power driven pawl starts its return stroke and reaches the point where it can snap down behind the drop-off shoulder of that tooth, the pressure stored in the spring 231 results in the pawl snapping downwardly into this desired position behind the drop-off shoulder 175. As soon as the downward pressure is released from the plunger 228, the compression spring 225 causes the power driven pawl 208 to be swung upwardly to its clearing position where it is inoperative to engage the teeth of the ratchet wheel.

Referring now to the adjustable driving arrangement for driving the eccentric 213, it will be seen in Figure 5 that this eccentric is formed on the inner end of a sleeve 235 which is rotatably mounted on a drive shaft 236. The inner race of an anti-friction ball bearing 237 is supported directly upon the eccentric 213, and the outer race of this ball bearing is seated within the bore of the eccentric follower strap or ring 212. The shaft 236 has bearing support in longitudinally spaced ball bearings 238, 239 which are supported within a bearing sleeve 241 projecting rearwardly from the mounting bracket 160. Suitably secured to the near end of the shaft 236 is a gear 242 which meshes with the gear 243 rotating synchronously with the crank shaft 11 of the press, the shaft 236 rotating in a 1 to 1 ratio with the crank shaft. The shaft has a splined or splayed front end to which is rigidly secured a rotating pointer 245, the latter being secured fast to the shaft by the nut 246. The rotating pointer 245 always revolves in permanently synchronized relation to the throw of the crank in the crank shaft 11, the pointer always pointing in the same direction as the crank throw, so that the arrow points up when the crank throw is up. Surrounding the pointer 245 is an outer dial ring 247 which is adapted to be driven from the arrow or pointer 245, and, which in turn is adapted to drive the eccentric 213. The pointer end of the arrow 245 has a V-shaped extremity 245', and the tail end of this pointer also has V-shaped extremities 245'. The surrounding dial ring 247 has internal teeth or notches 247' which are adapted to engage over the V-shaped extremities 245' of the pointer. It will be noted from Figure 4 that the front edge of this dial ring 247 carries angular markings 248 which assist in making angular adjustments between the pointer and the dial ring. As shown in Figure 5, the dial ring is secured to a hub 249 which is capable of rotative movement and sliding movement upon the outer end portion of the shaft 236. A sleeve 251 projects inwardly from this dial ring and hub portion, and the inner end of this sleeve is provided with splines 252 which have sliding engagement over splines 253 projecting outwardly from the front portion of the eccentric drive sleeve 235. A compression spring 254 confined between the sleeve 235 and hub 249 tends to shift the hub outwardly into engagement with the back side of the pointer 245, in which position the internal teeth 247' of the dial ring have direct driven engagement over the V-shaped extremities 245' of the pointer. When it is desired to make an angular adjustment in the timing of the eccentric 213 relatively to the position of the crank in the punch press crank shaft, the dial ring 247 is pushed rearwardly against the pressure of the spring 254 to a rear position to clear the teeth 247' from the extremities 245', whereupon the dial ring can be rotated either forwardly or backwardly the desired amount, and then permitted to come forwardly under the pressure of the spring 254, whereupon the internal teeth 247' reengage with the V-shaped extremities 245' in this new angular position.

In explaining the manner of making the timing adjustments for different operating speeds of the punch press, it should be borne in mind that inasmuch as the eccentric is angularly fixed to the dial, and inasmuch as the dial is driven by the pointer 245 which always points in the same direction as the crank throw of the crank shaft, the mechanism will always cause the press to stop somewhere, and the top of the dial will always indicate that point of the dial which should be adjusted into registry with the crank shaft indicating arrow 245 to bring the crank to the top of the stroke. To set this automatic timer so that it will stop the press with the crank at the top of the stroke, it is only necessary to make a test stop at the desired operating speed of the punch press; then observe the top point of the dial; then push the dial inwardly to disconnect the dial from the driving pointer and rotate the dial so that the point on the dial which was at the top is brought around to the tip end of the pointer; and then re-engage with the pointer in this angular relation. It will then be found that at the next stop of the punch press at that same operating speed, the pointer 245 will be found pointing straight up, indicating that the crank is at top dead center.

Referring now to the push-button controls for actuating the two operating plungers 202 and 228 of Figure 4, it will be seen from Figures 7, 8 and 9 that the plunger 202 is adapted to be actuated by a "Start" push-button 261 operating through a motion transmitting arm 262, and that the other plunger 228 is adapted to be actuated by a "Stop" push-button 263 operating through a motion transmitting arm 264. The motion transmitting arms 262 and 264 are not essential because the stems of the push-buttons 261 and 263 might be arranged to actuate the plungers 202 and 228 directly, but the provision of these motion transmitting arms enables the push-buttons to be disposed in an inclined position where they are more easily observed and read by the operator with respect to the functions performed by these push-buttons. The motion transmitting arms 262 and 264 are both pivotally mounted upon a transverse mounting shaft 265, and both arms carry upper and lower adjusting screws 266 and 267 for adjusting purposes.

The two push-buttons have reciprocal mounting in a control panel 268 which is suitably supported in a shield or cover housing 269 at the front end of the punch press (Figure 1). Mounted on the front side of the panel 268 is a front control plate 271, and mounted upon the rear side of this panel is a rear plate 272, these two plates being secured together through the panel by screws or bolts 273. Bearing arms 274 extend down from the rear plate 272 and support the transverse mounting shaft 265 upon which are journaled the two motion transmitting arms 262 and 264.

The stem 275 of the "Start" push-button 261 has a simple sliding mounting within a guide bushing 276 which extends through and clamps together the front and rear plates 271 and 272. It will be evident that upon a downward thrusting force being imparted to the push-button 261, the plunger 202 will be depressed and the starting pawl 191 will be moved downwardly through its predetermined starting stroke for advancing the switch controlling ratchet wheel to the point where the switch 157 will be moved to circuit closing position.

Referring now to the "Stop" push-button 263, it will be seen that its stem 279 also extends down through a similar bushing 281 which extends through and serves to clamp together the front and rear plates 271 and 272. However, in this instance the bushing 281 is internally counterbored and threaded at 282 for the reception of a reciprocal sleeve 283 which has an external thread 284 meshing with the thread 282. Secured to the upper end of this inner sleeve 283, as by a pin 285 or a drive fit, is a thumb lever 286 which, as shown in Figure 7, is adapted to be swung to the right for continuous running of the punch press, or to the left for single stroke operations. These two positions of the thumb lever are prominently denoted by legends on the front cover plate 271 (Figure 7), and the limits of these two positions are established by end stops 287 formed at the ends of a raised annular rib 288 which surrounds the upper portion of the push-button 263. The hub of the thumb lever 286 has two angularly spaced detent notches 289 formed therein, and snapping selectively into these notches is a detent ball 291 which is pressed into said notches by a compression spring 192 confined within a bore in the plate 271. The detent ball and notches coact to resiliently hold the thumb lever 286 in either one of its two extreme positions adjacent the end stops 287. The direction of pitch of the coacting threads 282, 284 is such that when the thumb lever 286 is swung to the left into the "Single Stroke" position, the inner sleeve 283 will be screwed downwardly within the outer sleeve or bushing 281 through a distance corresponding to the normal range of thrusting movement adapted to be imparted through the push-button 263. The lower end of this inner sleeve 283 engages the head 279' on the lower end of the stem 279 and carries the stem and push-button down along with it. Thus, the operation of swinging this thumb lever 286 into this left hand "Single Stroke" position serves to preset the stop plunger 263, i. e., it carries this stop plunger downwardly into the very position which it would occupy if the punch press operator pressed this push-button downwardly with his hand. The result is that in this left-hand position of the thumb lever 286, the plunger 228 is pushed downwardly, either to swing the power driven pawl 208 down into its lower position for engaging the ratchet teeth 173, or to compress the lost motion spring 231 preparatory to forcing the power driven pawl down into this lower position as soon as it has cleared one of the ratchet wheel teeth 173. Conversely, when the thumb lever 286 is swung over to its right hand position for continuous running of the press, the inner sleeve 283 is screwed upwardly within the outer sleeve or bushing 281 to a position where the motion transmitting lever 264 and plunger 228 can move up sufficiently far under the action of the return spring 225 to raise the power driven pawl 208 up to its idling or non-stepping position. This is the position of the parts shown in Figure 8. It should be noted that any time while the press is running in response to this setting of the thumb lever 286 in the continuous running position, the press may be immediately stopped by pressing downwardly upon the stop button 263. This immediately operates through the stem 279 and motion transmitting lever 264 to move the power driven pawl 208 downwardly into its lower position, or to compress the lost motion spring 231 for so shifting the pawl as soon as it is clear of one of the teeth on the ratchet wheel. As previously remarked, by having the opening of the switch 157 made responsive to the timer drive of pawl 208, even though manually initiated through stop button 263, it is possible to have the crank shaft come to rest at the top of the stroke at all times, or within a few degrees of the top of the stroke. This would not be possible if the opening of the switch 157 were dependent solely upon human timing in the depressing of the stop button 263.

It will be seen from the foregoing that if the punch press operator desires to have single stroke operation, he first moves the thumb lever 286 over to the left in the single stroke position, and then depresses the start button 261. The preliminary operation of moving the thumb lever 286 over into the left hand single stroke position presets the stop button 263 before the start button 261 is depressed. Hence, immediately upon the closing of the switch 157 and the engagement of the punch press clutch, the power driven pawl 208 is in readiness to transmit switch closing motion to the ratchet wheel 172 within a very short time after the crank shaft starts rotation, which time interval can be adjusted by rotative adjustments of the dial ring 247, as previously described. Hence, the opening of the switch 157 releases the punch press clutch and applies the brake all within the single revolution of the crank shaft, so that the crank shaft comes to rest at substantially the top of its stroke. If the punch press operator desires continuous operation of the press, he moves the thumb lever 286 over into the right hand, continuous running position, and then depresses the start button 261. With the thumb lever 286 in its right hand position, the timer driven pawl 286 is held in its raised idling position where it is non-effective to transmit switch opening movement to the ratchet wheel 172. Hence, the press operates continuously until the operator depresses the stop button 263 or swings the thumb lever over into the left hand single stroke position, either of which operations cause the timer driven pawl 208 to be swung downwardly into operative position for stepping the ratchet wheel 172 through the very short interval of motion necessary to trip the switch pawl 171 and open the switch 157.

Referring now to the automatic safety stop feature which causes the crank and press ram to stop almost instantly in the event of a jam in the dies or failure of the automatic stock feeding mechanism, it will be seen from Figure 1 that the control circuit 156 is made responsive to automatic safety switches typically represented by the two or more switches B, B etc. These automatic safety switches are normally closed and are suitably associated with the press in such manner that in case of a jam in the dies or failure of the automatic stock feeding mechanism, one or more of these switches will be opened. The supply current for this control circuit 156 is shown as being fed from a junction box A on the electric motor, and the two conductors of the control circuit are indicated at 156' and 156''. One conductor 156' extends from the junction box to one side of the control switch 157, and the other conductor 156'' extends in series through the air valve solenoid 152 and through the automatic safety switches B, B etc. to the other side of the control switch 157. It will hence be seen that in the event of a jam in the dies, failure of the automatic stock feeding mechanism, or other mal-functioning of the press or associated apparatus, one or more of the safety switches B, B etc. will be automatically opened and the press will be stopped instantly before serious damage occurs. Such stopping of the crank and ram will occur almost at once because of the ability of my improved clutch-brake control to act instantly anywhere in the 360 degrees of crank rotation, as will be evident from the preceding description of the manually-set single stroke operation and continuous running operation.

While I have illustrated and described what I regard to be the preferred embodiment of my invention, nevertheless it will be understood that such is merely exemplary and that numerous modifications and rearrangements may be made therein without departing from the essence of the invention.

I claim:

1. In combination, a clutch adapted for automatic one-cycle-stop operation, power means for effecting engagement or disengagement of said clutch, electrical means for controlling said power means including a switch, a rotary switch actuator operative to successively close and open said switch by step-by-step rotary movement of said switch actuator, a manually operated start control for causing stepping movement of said switch actuator into one position, and a clutch-driven manually responsive control for causing stepping movement of said switch actuator into another position.

2. In clutch control mechanism capable of obtaining single stroke operation in a punch press having a crank shaft, the combination of a clutch, power means for controlling engagement of said clutch, electrical means for controlling said power means including electrical switch means, switch actuating means for moving said switch means into closed and opened positions, a manually operated start control operative to impart movement to said switch actuating means for moving said switch means into one of said positions, and a manually operated stop control positively power driven by every revolution of said crank shaft and operative to impart movement to said switch actuating means for moving said switch means into its other position.

3. In clutch control mechanism for use in a punch press, the combination of a clutch operative to drive the crank shaft of said press, compressed air power means for controlling said clutch, an electrically controlled valve for controlling the application of compressed air to said power means, a switch controlling said valve, a ratchet wheel for actuating said switch, a start-pawl for advancing said ratchet wheel to one switch actuating position, a stop-pawl for advancing said ratchet wheel to another switch actuating position, synchronizing means for causing said stop pawl to have an operating stroke synchronously with said crank shaft, and manual means for determining whether said stroke shall be operative to advance said ratchet wheel.

4. In clutch control mechanism for a punch press intended for automatic single-stroke operation, the combination of clutch-brake mechanism operative to start and stop the crank shaft of the press, compressed air power means for controlling the engaging or releasing of said clutch-brake mechanism, an electrically operated air valve controlling the application of compressed air to said power means, a circuit controlling said air valve, a main switch controlling said circuit, a ratchet wheel controlling said main switch, a start-pawl for actuating said ratchet wheel to switch closing position, manual means for operating said start-pawl, a stop-pawl for actuating said ratchet wheel to switch opening position, power driven means for imparting a reciprocating stroke to said stop-pawl in synchronism with the rotation of said crank shaft, manual means for moving said reciprocating stroke into position where it will be effective on said ratchet wheel, and presetting means for presetting said last named manual means to a one-stroke position.

5. In clutch control mechanism for a machine characterized by a driven member adapted to have a one-cycle stop motion, the combination of a clutch adapted to drive said driven member, fluid pressure power means for controlling said clutch, a rotatable control wheel, means responsive to movement of said control wheel for controlling said fluid pressure power means, a start-pawl for actuating said control wheel to a clutch engaging position, a stop-pawl for actuating said control wheel to a clutch releasing position, and means for transmitting motion from said driven member to said stop pawl.

6. In clutch control mechanism for a machine characterized by a driven member adapted to have a one-cycle stop motion, the combination of a clutch adapted to drive said driven member, fluid pressure power means for controlling said clutch, a rotatable control wheel, means responsive to movement of said control wheel for controlling said fluid pressure power means, a manually actuated start-pawl for actuating said control wheel to a clutch engaging position, a stop-pawl for actuating said control wheel to a clutch releasing position, means for transmitting actuating motion from said driven member to said stop pawl, manual means for determining whether such actuating motion of said stop-pawl shall be effective to actuate said control wheel, a relatively stationary surface in juxtaposition to a rotating surface of said control wheel, and balls carried by one of said surfaces adapted to have resilient coaction with recesses in the other of said surfaces for influencing the motion of said control wheel.

7. In clutch control mechanism for a machine characterized by a driven member adapted to have a one-cycle stop motion, the combination of a clutch adapted to drive said driven member, fluid pressure power means for controlling said clutch, a rotatable control wheel, means responsive to movement of said control wheel for controlling said fluid pressure power means, a start-pawl for actuating said control wheel to a clutch engaging position, a start push button conected to actuate said start-pawl, a stop-pawl for actuating said control wheel to a clutch releasing position, means for transmitting stepping motion from said driven member to said stop pawl, a stop push button connected to shift the plane of said stepping motion between an idling position where the stop pawl is ineffective to actuate said control wheel, to an operative position where the stop pawl is effective to actuate said control wheel, and a preselecting control capable of being preset by the operator for shifting said stop push button to such latter position.

8. In clutch control mechanism for a machine characterized by a driven member adapted to have a one-cycle stop motion, the combination of a clutch adapted to drive said driven member, fluid pressure power means for controlling said clutch, a rotatable control wheel, means responsive to movement of said control wheel for controlling said fluid pressure power means, a start-pawl for actuating said control wheel to a clutch engaging position, a stop-pawl for actuating said control wheel to a clutch releasing position, means for transmitting a synchronizing drive from said driven member to said stop-pawl for causing said latter pawl to transmit its actuating motion to said control wheel in a predetermined timed relation to the motion of said driven member, and adjustable means connected between said driven member and said stop pawl enabling the operator to adjust said predetermined timed relation between the driven member and stop pawl.

9. In clutch mechanism, the combination of a driving member, a rotatable driven member, a self-energizing axially shiftable clutch spring-biased to engage by shifting movement in one direction, control apparatus for said clutch comprising a servo action axially shiftable brake spring-biased to engage by shifting movement in the other direction, the spring biasing force of said brake being operative to overcome the spring biasing force of said clutch, electrically controlled fluid pressure power means operative to shift said brake to a brake releasing position, electrical switch means for controlling said fluid pressure power means, a start control for governing said electrical switch means, and a stop control responsive to motion of said driven member for governing said electrical switch means.

10. In clutch mechanism, the combination of a driving member, a rotatable driven member, a self-energizing axially shiftable clutch spring-biased to engage by shifting movement in one direction, control apparatus for said clutch comprising a servo action axially shiftable brake spring-biased to engage by shifting movement in the other direction, the spring biasing force of said brake being operative to overcome the spring biasing force of said clutch, compressed air power means operative to shift said brake to a brake releasing position, an electrically operated air valve controlling said compressed air power means, switch means controlling said air valve, a manually actuated start control for governing said switch means to engage the clutch, a stop control for governing said switch means to release the clutch, and means for causing said stop control to operate in timed relation to the motion of said driven member.

11. In clutch mechanism, the combination of a driving member, a rotatable driven member, a self-energizing axially shiftable clutch spring-biased to engage by shifting movement in one direction, control apparatus for said clutch comprising a servo action axially shiftable brake spring-biased to engage by shifting movement in the other direction, the spring biasing force of said brake being operative to overcome the spring biasing force of said clutch, a compressed air cylinder and piston connected to shift said brake to a brake releasing position, said cylinder shifting directly with said brake, an air valve mounted directly on said cylinder and shifting therewith, and means for controlling said air valve.

12. In clutch mechanism, the combination of a driving member, a rotatable driven member, a self-energizing axially shiftable clutch spring-biased to engage by shifting movement in one direction, control apparatus for said clutch comprising a servo action axially shiftable brake spring-biased to engage by shifting movement in the other direction, the spring biasing force of said brake being operative to overcome the spring biasing force of said clutch, compressed air power means for shifting said brake to its brake-releasing, clutch-engaging position, a manually actuated start control for causing said power means to shift said brake to its brake-releasing, clutch-engaging position, a manually presettable stop control driven by said driven member for releasing said power means to permit said brake to shift to its brake-engaging clutch-releasing position, and means enabling said stop control to be preset for automatic single-cycle operation in advance of the engaging of said clutch by said manually actuated start control.

13. In clutch mechanism, the combination of a driving member, a rotatable driven member, a self-energizing axially shiftable clutch-biased to engage by shifting movement in one direction, control apparatus for said clutch comprising a servo action axially shiftable brake spring-biased to engage by shifting movement in the other direction, the spring biasing force of said brake being operative to overcome the spring biasing force of said clutch, compressed air power means operative to shift said brake, electrical control means governing said compressed air power means, a manually actuated start control operating through said electrical control means for causing said power means to shift said brake to its brake-releasing clutch-engaging position, a manually presettable stop control driven by said driven member and operating through said electrical control means for releasing said power means to permit said brake to shift to its brake-engaging clutch-releasing position, and means enabling said stop control to be preset for automatic single-cycle operation in advance of the engaging of said clutch by said manually actuated start control.

CLARENCE M. EASON.

REFERENCES CITED

The following references are of record in the file of this patent:

UNITED STATES PATENTS

| Number | Name | Date |
|---|---|---|
| Re. 21,017 | Mellon | Feb. 28, 1939 |
| 1,203,028 | Malm | Oct. 31, 1916 |
| 1,612,239 | Turney | Dec. 28, 1926 |
| 1,704,904 | Schaub | Mar. 12, 1929 |
| 2,052,752 | Criley | Sept. 1, 1936 |
| 2,185,096 | Treer | Dec. 26, 1939 |
| 2,185,551 | Glasner et al. | Jan. 2, 1940 |
| 2,198,767 | Glasner | Apr. 30, 1940 |
| 2,210,227 | Williamson | Aug. 6, 1940 |
| 2,302,838 | Bundy | Nov. 24, 1942 |
| 2,340,416 | Eason | Feb. 1, 1944 |
| 2,427,493 | Bullard | Sept. 16, 1947 |